UNITED STATES PATENT OFFICE.

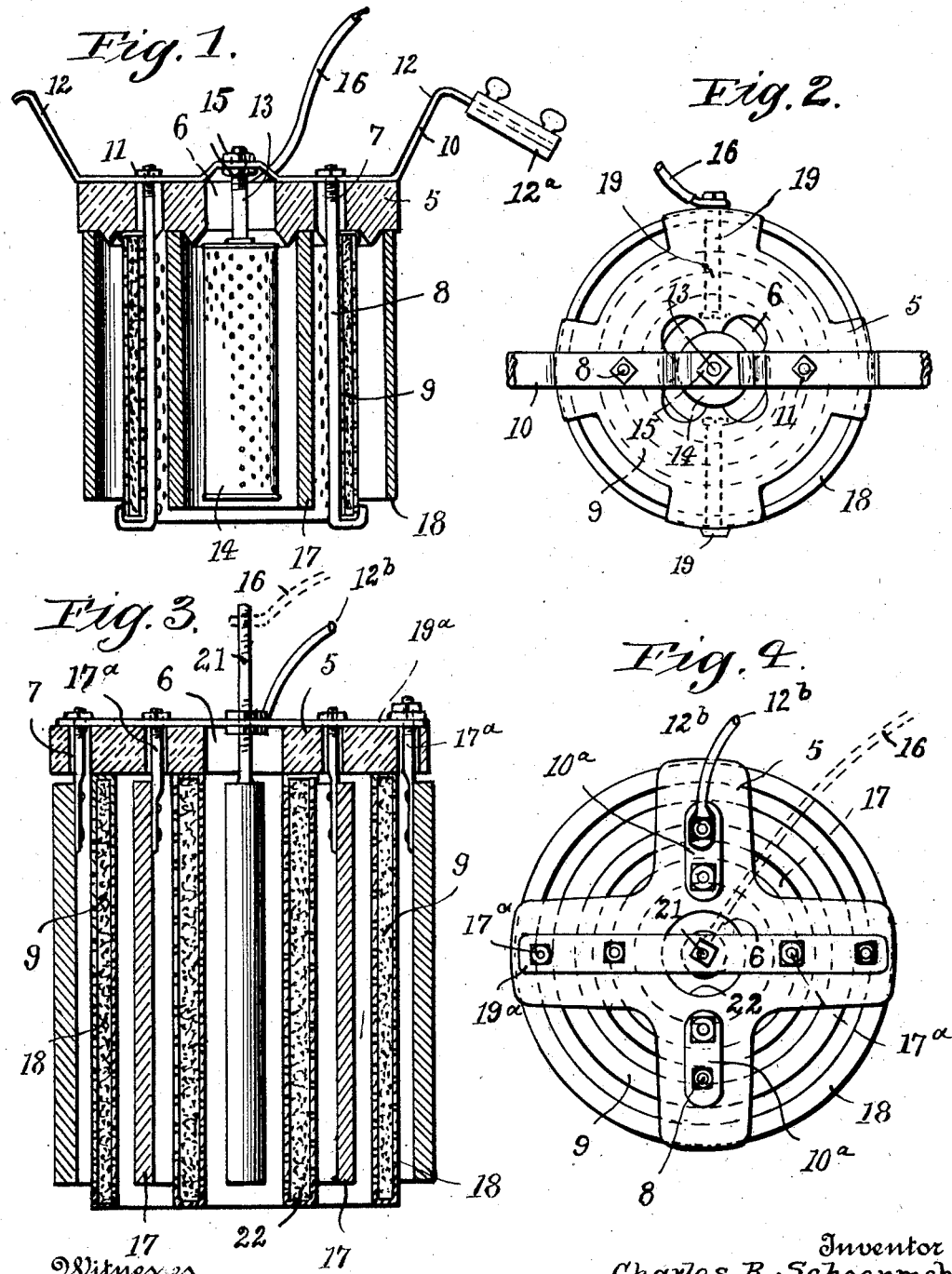

CHARLES B. SCHOENMEHL AND MARTIN L. MARTUS, OF WATERBURY, CONNECTICUT, ASSIGNORS TO THE WATERBURY BATTERY COMPANY, OF WATERBURY, CONNECTICUT, A CORPORATION OF CONNECTICUT.

PRIMARY BATTERY.

1,360,589.  Specification of Letters Patent.  Patented Nov. 30, 1920.

Application filed June 4, 1917. Serial No. 172,600.

*To all whom it may concern:*

Be it known that we, CHARLES B. SCHOENMEHL and MARTIN L. MARTUS, citizens of the United States, and residents of Waterbury, in the county of New Haven and State of Connecticut, have invented certain new and useful Improvements in Primary Batteries, of which the following is a specification.

Our invention relates to primary batteries and particularly refers to a cylindrical form of an assembled element battery.

It is the object of the invention to produce a cylindrical form of battery which shall include a series of four or more annular electrodes arranged one within the other so that the walls of the respective electrodes will be alternately arranged one within the other and so as to afford two working faces for each of the electrodes, except the outermost one and whereby four or more electrodes are employed, two of which are of one polarity and two or more of another, all supported from a common insulative member which in turn is provided with suitable suspending means whereby the unit may be supported within a battery jar. Further to construct this insulating member and the electrodes supported therefrom so that all of the electrodes of one polarity will be mechanically and electrically connected, whereas those of the other polarity will be similarly supported and connected to form the terminal for the opposite side of the battery.

A battery of this type will obviously be of greater efficiency than where but two annular electrodes of possibly different construction, are employed to the extent that one in many instances would serve to do the work required for two of the old style. Besides our present form of battery will not occupy as much room and further will be less expensive to produce.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Figure 1 shows a central vertical cross section through a form of our invention wherein four electrodes are employed two of which are negative electrodes and the other two positive electrodes.

Fig. 2 is a plan view of the assembled element shown in Fig. 1.

Fig. 3 is a further central vertical sectional view of a slightly different form of assembled element and wherein two negative electrodes are employed as between three positive electrodes, and Fig. 4 shows a plan view of the form of assembled element shown in Fig. 3.

Referring in detail to Figs. 1 and 2 5 represents an insulative supporting member having a suitable central opening 6 therethrough and several smaller holes 7 to accommodate rods 8 and stems 17$^a$ for attaching the annular electrode 9 and 17. To the top portion of this insulating block is secured a metal hanger 10 that is secured to the insulating block by means of the rod 8 and the nuts 11 mounted thereon. Said hangers are further provided with upwardly disposed end portions that are bent to form hooks 12 to engage the top edge portion of the battery jar, not shown. A coupling 12$^a$ is attached to the end of one of these hooks and serves for the connection of another cell or possibly a line wire. This hanger is further provided with a central hole through which the threaded stem 13 of the centrally arranged negative electrode 14 passes for attachment directly to the metal hanger by means of the nuts 15 threadably mounted upon the stem. This central electrode is preferably in the form of a cylindrical basket made up of an outer annular metal wall having openings therethrough and provided with a top and bottom cap that fits against the opposite end portions of the annular metal wall. This basket is filled with depolarizing material of either the powdered, granular or solidified form, thus forming a negative electrode.

The outer annular form of negative electrode, before mentioned, and shown in Figs. 1 and 2, includes an inner and outer annular metal wall which may be perforated or formed of woven wire mesh as preferred. The ends of these electrodes are inclosed, and the top end is held against the underside of the insulative support, while the lower end is engaged by the hook ends of the rods 8. The nuts 11 of the rods are obviously tightened in a manner to draw the element up to hold the electrode in position. This element, like the central member, is filled with a suitable depolarizing material of any kind and thus constitutes the outer negative electrode in this form of assembled element.

This assembled element, shown in Figs. 1 and 2, includes two annular positive elements 17 and 18, the inner and thicker one of which is arranged central between the two negative electrodes 14 and 9, while the outer and thinner one 18 is exterior of the negative electrode 9 and serves to be worked upon from the outer face of the negative electrode 9. These positive or zinc electrodes are provided with a single terminal wire 16 which may be connected to a bridge 19, as shown in Figs. 1 and 2, or to the suspending rod 21 indicated by dotted lines in Fig. 2 and whereby the two electrodes are electrically connected.

The modified construction shown in Figs. 3 and 4 includes two annular receptacles or compressed elements forming the negative electrodes and both of these are connected to the insulating block 5 by means of rods 8 similar to those employed in Fig. 1. These elements are formed of perforated metal and include a filling of depolarizing material similar to that used in the before mentioned negative electrodes.

In this form of the invention we have shown the central electrode 20 as being a positive electrode provided with a central suspending rod 21 which is connected to the members 19ª by a nut and also intended to form a hanger so that the assembled elements may be hung from a battery jar cover. This suspending rod may be used as a terminal connection, if desired in which case the wire 16 would be connected thereto as shown in Figs. 3 and 4. In addition to this central zinc we employ two annular members 17 and 18, one of which hangs between the two negative electrodes 9 and 22 and the other being placed around the outer negative electrode 9. All three of the positive electrodes are supported from the cross member 19ª constituting one pole of the battery, and to which the terminal wire 16 may be connected. In this instance, the positive electrodes are all connected to the cross members, while the negative electrodes are suitably connected by bridges 10ª and are adapted for the connection of a terminal wire 12ᵇ.

Thus it will be seen that the invention is susceptible of modification, along this line, and may employ either a positive or negative central electrode as the central element and may be formed of four or five electrodes as preferred. The improvement broadly resides in the employment of four or more annular forms of electrodes of two opposite polarities alternately arranged one between the other in a manner to form a very compact and efficient battery.

Having thus described our invention what we claim and desire to secure by Letters Patent is:—

1. In a primary battery of the class described, the combination of an assembled element, comprising a single insulating supporting member, two or more annular electrodes of one polarity directly connected to the under side of the insulative supporting member, two or more annular electrodes of an opposite polarity, means on the top side of the insulative supporting member for mechanically and electrically connecting the several electrodes of the one polarity, means for mechanically and electrically connecting the electrodes of the opposite polarity, and suspending means attached to the insulating block for suspending the assembled element entirely from its upper portion within a battery jar.

2. In a primary battery of the class described, the combination of an assembled element comprising a supporting member formed of a single piece of insulating material and having a plurality of spaced openings, a hanger arranged above said supporting member, a plurality of annular spaced electrodes of similar polarity mechanically and electrically connected and abutting against the under surface of said supporting member, a plurality of annular electrodes of different polarity than the first mentioned electrodes spaced from and interposed therebetween, and means for mechanically and electrically connecting said electrodes comprising a plurality of rods, each of said rods being connected to one of said electrodes at its lower end and passing upwardly through one of the said openings formed in the supporting member and being bolted to the said hanger, the said rods detachably connecting the said hanger to the supporting member.

Signed at Waterbury, in the county of New Haven and State of Connecticut, this 29th day of May, A. D. 1917.

CHARLES B. SCHOENMEHL.
MARTIN L. MARTUS.

Witnesses:
HARRY T. HUBERT,
JAS. J. CALDWELL.